United States Patent [19]
Stoll

[11] Patent Number: 5,875,622
[45] Date of Patent: Mar. 2, 1999

[54] HARVESTING APPARATUS FOR COMMINUTING PLANT BEFORE SEPARATION

[76] Inventor: Eugene A. Stoll, Rte. 3, Box 377, Stanberry, Mo. 64489

[21] Appl. No.: 615,609

[22] Filed: Mar. 13, 1996

[51] Int. Cl.[6] ................................................ A01D 45/02
[52] U.S. Cl. ............................ 56/60; 56/113; 56/94; 460/38
[58] Field of Search .................... 56/60, 63, 64, 56/94, 103, 113, 115, 117, 119; 460/38, 39, 45, 46, 48, 119

[56] References Cited

U.S. PATENT DOCUMENTS

| | | |
|---|---|---|
| 2,385,193 | 9/1945 | Burgin . |
| 2,442,520 | 6/1948 | Van Sickle . |
| 2,657,513 | 11/1953 | Martin . |
| 2,867,068 | 1/1959 | Dumanowski . |
| 3,000,164 | 9/1961 | Kiecker . |
| 3,095,680 | 7/1963 | Thornton . |
| 3,439,479 | 4/1969 | Zitko et al. . |
| 3,623,298 | 11/1971 | Hitzhusen . |
| 3,664,098 | 5/1972 | Thor . |
| 3,673,774 | 7/1972 | Mizzi ........................................ 56/63 X |
| 3,715,873 | 2/1973 | Zweegers . |
| 4,182,098 | 1/1980 | Kass . |
| 4,188,160 | 2/1980 | Corbett et al. . |
| 4,261,816 | 4/1981 | Beck et al. . |
| 4,291,521 | 9/1981 | Haake ...................................... 56/60 X |
| 4,324,091 | 4/1982 | Wistuba et al. . |
| 4,373,536 | 2/1983 | Da Silva .................................. 460/46 |
| 4,386,492 | 6/1983 | Tilby ........................................ 56/60 X |
| 4,433,531 | 2/1984 | Kesl et al. ............................. 56/113 X |
| 4,539,799 | 9/1985 | Kalverkamp . |
| 4,594,842 | 6/1986 | Wolters et al. ........................ 56/119 X |
| 4,628,946 | 12/1986 | De Busscher et al. .............. 56/14.6 X |
| 4,771,592 | 9/1988 | Krone et al. . |
| 4,926,623 | 5/1990 | Fiener .................................... 56/119 X |
| 5,237,804 | 8/1993 | Bertling ...................................... 56/60 |
| 5,323,594 | 6/1994 | Whitney . |
| 5,359,838 | 11/1994 | Madsen . |

FOREIGN PATENT DOCUMENTS

| | | | |
|---|---|---|---|
| 0886806 | 12/1981 | U.S.S.R. ..................................... 56/62 |
| 001729325 A | 4/1992 | U.S.S.R. ..................................... 56/60 |

OTHER PUBLICATIONS

This is the New Chopper–Thrasher Method, Farm Implement and Machine Review, pp. 1081–1085, Nov. 1956.

*Primary Examiner*—Terry Lee Melius
*Assistant Examiner*—Victor Batson
*Attorney, Agent, or Firm*—Shook, Hardy & Bacon L.L.P.

[57] ABSTRACT

A harvesting apparatus for a crop has a separator for separating grain from the stalks. The separator has a platform adjustable to different heights positioned on the front end of the separator. The separator also has a rearward end for discharging stalks separated from the grain. A cutter is attached to the front end of the platform and is capable of cutting the crop close to the ground and feeding both the crop and the stalks into the platform. A chopper is interposed between the cutter and the platform so that the stalks of the crop are comminuted prior to entering the platform and prior to the grain being separated from the stalks.

9 Claims, 3 Drawing Sheets

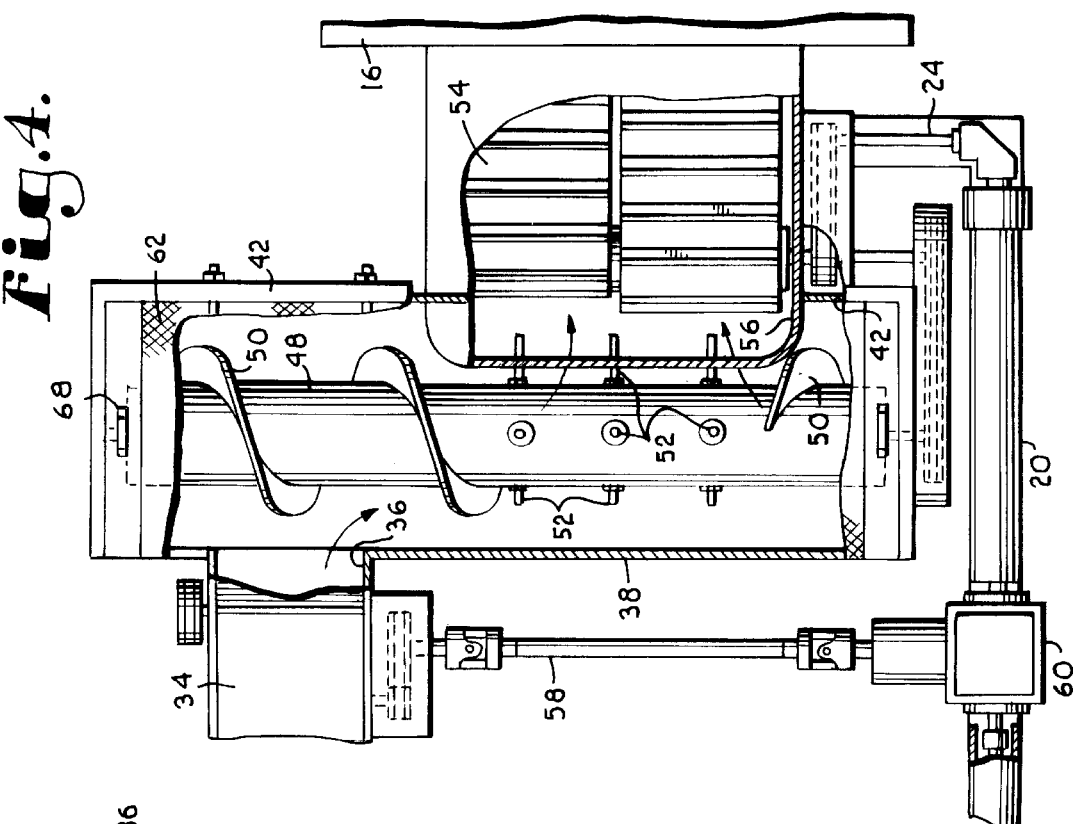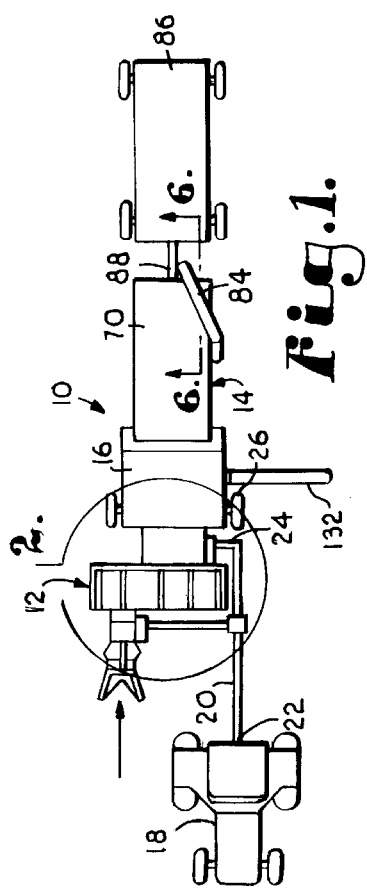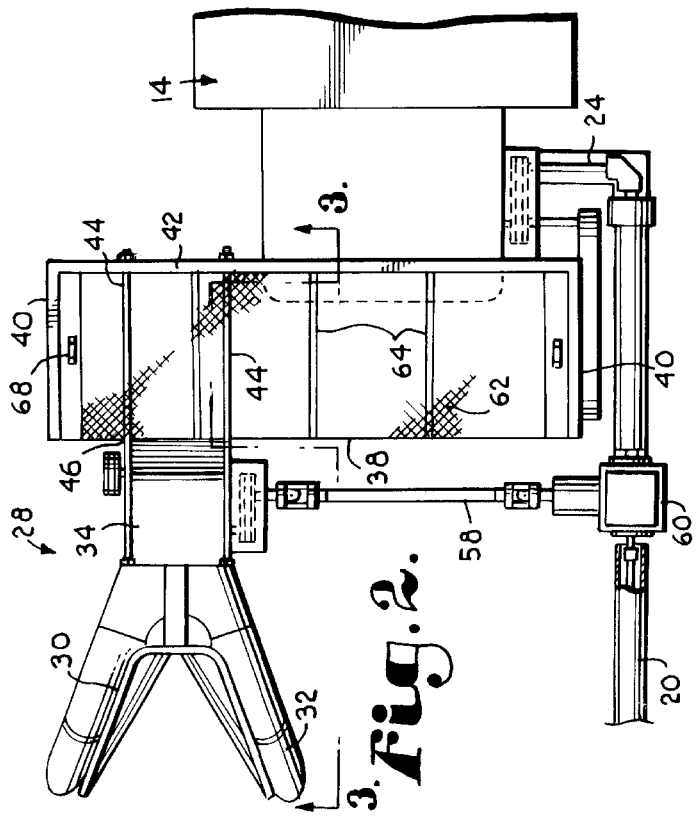

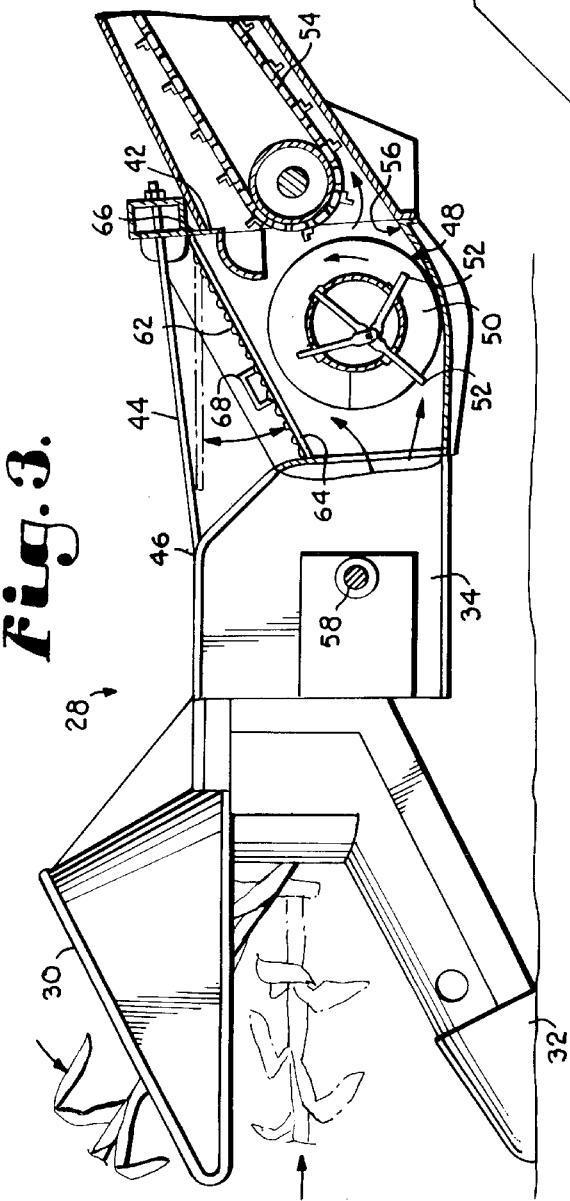
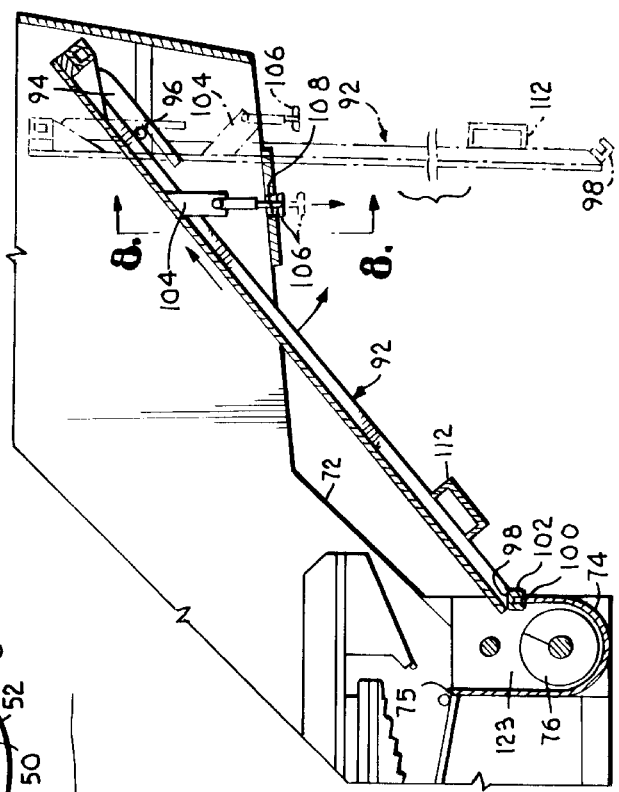
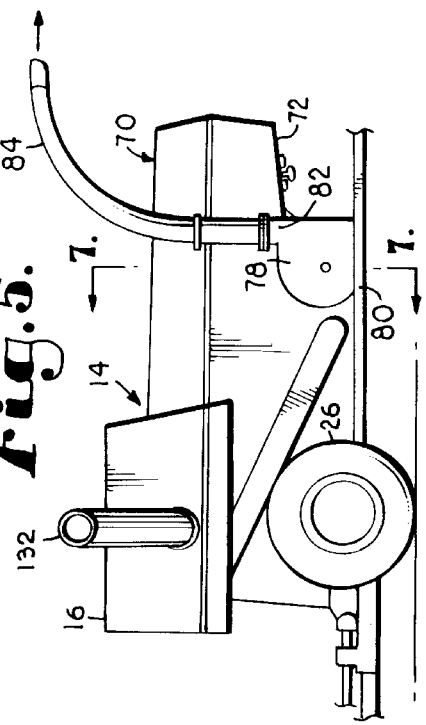

HARVESTING APPARATUS FOR COMMINUTING PLANT BEFORE SEPARATION

This invention relates to an apparatus for harvesting grain, and more particularly, an apparatus which allows both collection of the grain and chopping of the crop residue for livestock feed.

Modern harvesting of grains, in particular corn, is typically done by a self-propelled or pull-type "combine." These "combines" include a platform portion which is used to either cut the stalks of the crop directly below where the grain of the crop is located or, as is often the case in the harvesting of corn, pluck the ears of corn from the stalks, thus leaving the stalks enrooted in the ground. More specifically, during the harvesting of corn for example, some combines have platforms which cut the cornstalk at a location that is slightly below where the lowest ear of corn is located. The remaining lower portions of the cornstalk remain enrooted in the ground. Other types of combines have platforms which strip or pluck the ears of corn from the cornstalk without cutting the stalk.

In either type of corn harvesting, the ears containing the corn kernels are conveyed to a separator portion of the combine. In the separator, through a series of thrashing and sifting operations, the corn kernels are separated from the corncobs and any other residue (for instance, leaves, husks, and stalk portions) which may have been conveyed into the separator portion. Thereafter, the crop residue is ejected from the back of the combine and oftentimes through use of mechanical means spread across the ground.

Typically, the corn plant residue ejected from the back of the combine and the cornstalks remaining enrooted in the ground have exceptionally high nutritional value and are greatly desired as livestock feed. Therefore, after the corn kernels have been harvested, oftentimes a cutter of some sort is used to separate the cornstalks at a location close to the ground. Thereafter, a chopper attached to the cutter is used to comminute the cornstalks. The cornstalks are then usually blown by means of a fan into a collecting container pulled along with the cutter/chopper. After the comminuted stalks have been collected, they are typically deposited in a ground silo wherein they ferment, thus forming a very desirable type of livestock feed. The apparatus used to cut and chop the cornstalks is sometimes referred to as an ensilage or silage cutter.

There are many drawbacks associated with these prior art harvesting methods. First of all, as is apparent, the two-stage method described above requires a double pass over the cornfield. Further, oftentimes after the corn ears have been separated from the rest of the stalks, the stalks will tend to dry out somewhat due to the exposure of cut portions to the air. This can result in the stalks being not as desirable for silage. More specifically, a certain amount of moisture is necessary to ensure that the silage ferments in the silo to provide an adequate cattle feed. Therefore, oftentimes the moisture level of the stalks by the time they are collected is too low to allow adequate fermentation.

Attempts have been made in the past to both collect the grain kernels and the stalks, leaf and husk portions. However, these prior art structures suffer from various drawbacks. Mainly, the entire corn plant (including the stalk, leaves, ears, and husks) is ingested into the separating portion of the machine before the stalks are comminuted. As is apparent, attempting to separate the grain kernels from the entire intact corn plant can result in very low efficiency and clogging problems in the separator portion. For example, U.S. Pat. No. 3,623,298 discloses a harvest machine that simultaneously harvests the cornstalks and the ears of corn. The device severs the cornstalk close to the ground and ingests the entire corn plant into the separator portion where the kernels of corn are separated. Thereafter, a chopper is used to comminute the remaining stalks and leaves which can then be blown into a collection container of some sort. U.S. Pat. No. 2,385,193 also discloses a device in which the entire corn plant is taken into the separator wherein the corn kernels are separated and thereafter the remainder of the plant comminuted into a shredded form.

As is apparent, the above references all ingest entire corn plants into a separator and separate the corn kernels from the intact plant prior to comminuting the rest of the plant into feed.

U.S. Pat. No. 4,539,799 discloses a device which plucks the corn ear from the stalk and thereafter collects the corn ears. Further, the stalk portions remaining after the ears have been separated are chopped and either deposited on the ground or are conveyed to an adjacent truck traveling next to the harvesting vehicle. This structure is disadvantageous because it may require an additional conveyance structure to transfer the chopped stalk portions into the auxiliary vehicle. Further, because the leaves and husks surrounding the ears are separated from the stalk, the husks and leaves cannot be salvaged as livestock feed.

Therefore, a harvesting apparatus is needed which alleviates the drawbacks of the prior harvesting apparatuses discussed above.

Accordingly, it is a primary object of the present invention to provide a harvesting apparatus which comminutes the entire crop plant harvested, including the stalks and leaves, prior to the comminuted materials being introduced into a grain separation portion of the apparatus.

Another object of the invention is to provide a harvesting apparatus constructed of a typical combine with a separator portion and a platform portion which has been modified with a chopper attached to the front end of the platform and a collection and blower device attached to the back end of the separator so that the entire crop plant is completely comminuted as it enters the separator portion of the combine, and after the grain has been separated from the comminuted material, the residue comminuted material is collected for livestock feed.

A further object of this invention is to provide a harvesting apparatus which prevents comminuted material including grain kernels from being expelled from the platform of the apparatus during operation.

These and other important aims and objectives for the present invention will be further described or will become apparent from the following description and explanation of the drawings, wherein:

FIG. 1 is a diagrammatic top plan view of a harvesting apparatus according to the present invention, the apparatus drivingly coupled and pulled by a tractor and having a silage collection wagon hitched to its rearward end;

FIG. 2 is a fragmentary, enlarged top plan view of the area designated by the reference 2 in FIG. 1 showing in detail the cutter, chopper and platform sections of the present invention;

FIG. 3 is an enlarged, detailed cross-sectional view taken generally along lines 3—3 of FIG. 2 showing a crop plant being ingested into the cutter and chopper sections and showing the structures in the platform for collecting the comminuted crop plant after it has exited the chopper, and further showing in phantom lines an open-position of the platform cover screen;

FIG. 4 is a fragmentary, enlarged top plan view similar to FIG. 2, parts being broken away and shown in cross section to reveal details of construction and arrows showing the flow of comminuted material through the platform and into the separator of the harvesting apparatus;

FIG. 5 is a fragmentary side elevational view of the harvesting apparatus of FIG. 1 showing only the separator portion of the apparatus and showing the structures attached to the rearward end of the apparatus for the collection of the crop residue after the grain has been separated;

FIG. 6 is a fragmentary, detailed cross-sectional view taken generally along lines 6—6 of FIG. 1 showing the removable blocking plate used to block the rearward end of the separator portion to collect crop residue, an alternative position of the blocking plate shown in phantom lines;

Figure 7:
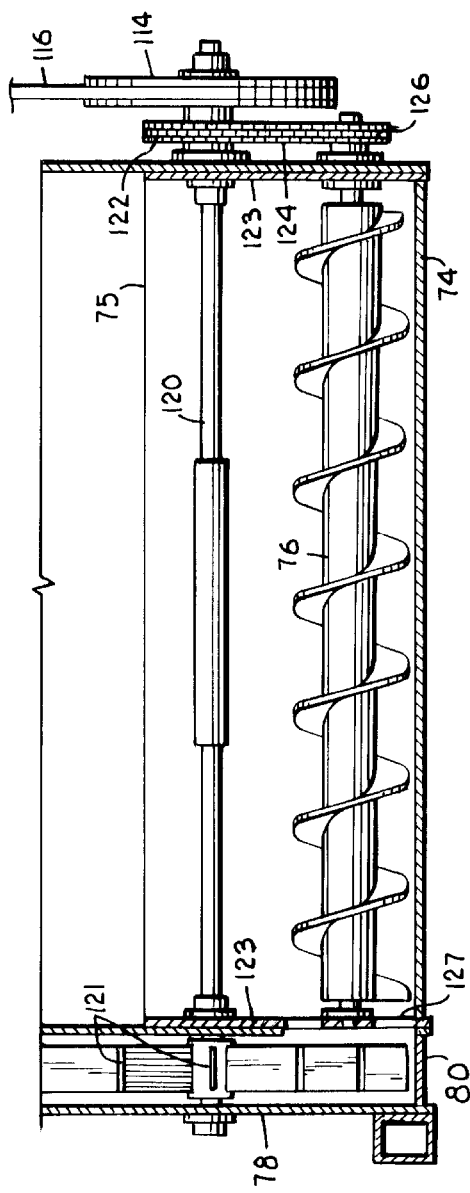
FIG. 7 is an enlarged fragmentary detailed cross-sectional view taken generally along lines 7—7 of FIG. 5 showing the auger for conveying crop residue dispelled from the back of the separator into the blower fan and showing the drive mechanisms for driving both the auger and the blower fan.

A harvesting apparatus embodying the principles of the invention is broadly designated in the drawings by the reference numeral 10. Machine 10 includes an adjustable platform 12 capable of being raised and lowered to various vertical positions and a separator portion 14 connected to platform 12, as best shown in FIG. 1. Separator 14 serves to separate grain from a crop plant and collect the grain in a storage bin 16. Platform 12 and separator 14 are part of a typical "combine" used to harvest grain. The structure and operation of platform 12 and separator 14 are conventional and well-known to one of ordinary skill in the art. Therefore, a detailed discussion of their operation is omitted. The combine shown in the drawings is a pull-type combine. That is, the combine is pulled behind and powered by the power takeoff of a tractor 18. The combine is drivingly connected to the tractor via a power takeoff shaft 20 which runs from a tractor power takeoff outlet 22 to a power inlet 24 on the combine as best shown in FIGS. 1, 2 and 4. It is this supplying of power to inlet 24 which drives all the feed, conveying, thrashing and sifting mechanisms found in separator 14. Wheels 26 are attached to separator 14 to allow it to be pulled across the ground by tractor 18.

The present invention lies in the modification of this typical combine to allow the cutting of an entire crop plant and separating the grain therefrom while at the same time chopping and collecting the plant residue for silage. It has been found that one particular type of combine that can be easily modified is a John Deere 6601 pull-type combine. Although the below modifications will be described with respect to a pull-type combine, it is contemplated that a self-propelled combine can be modified just as easily to accomplish the objects of the present invention.

The conventional combine is first modified by attaching a silage cutter and chopper mechanism 28 to the front of platform 12 as best shown in FIGS. 1–4. More specifically, mechanism 28 has an upper guide member 30 and a lower combination cutter/guide member 32 which serve to guide rows of corn plants or other types of crop plants into a chopper portion 34. Lower guide 32 grabs the stalks of corn plants near the ground surface, cuts the stalks, and pulls the bottom portion of the plant inward toward chopper 34 as best shown in FIG. 3. Upper guide 30 serves to angle the plants being conveyed inward towards the chopper so that the lower portions of the plant are fed first into chopper 34 and the upper ends of the plant are fed last into chopper 34 also as best shown in FIG. 3. Within chopper 34 the crop plants are comminuted into small pieces by chopping mechanisms. Guides 30 and 32 and chopper 34 all operate in a manner which is well-known to one of ordinary skill in the art, thus further discussion of their operation is omitted. Mechanism 28 can be a portion of a conventional silage cutter, for instance a John Deere 35 ensilage cutter. As is apparent, a whole corn plant is ingested by and comminuted within chopper 34. Thus, the cob, grain, stalk, leaves and husks all pass through and are comminuted within chopper 34.

After the corn plant is comminuted within chopper 34, it is discharged from the chopper via port 36 into platform 12 as best shown in FIGS. 3 and 4. Platform 12 is modified according to the present invention to accommodate mechanism 28. More specifically, typically the platform is the structure used to gather or cut the crop plant. Therefore, platform 12 is conventionally open on the front and has either a sickle bar for cutting the plant stalks or a pickup belt for picking up windrowed crops. The front portion of the platform has been modified by truncating it and placing a planar mounting and containing plate 38 all the way across the length of the platform as best shown in FIGS. 2 and 4. Therefore, plate 38, platform sidewalls 40 and a platform rear wall 42 generally form an enclosure into which the comminuted crop plant is discharged from chopper 34. Port 36 is formed in plate 38 to allow discharge of the comminuted plant into the platform.

Mechanism 28 is mounted via chopper 34 to plate 38 by welding or other suitable attachment. Also, it may be necessary to extend reinforcing bars 44 from the top of wall 42 to connection points 46 on chopper 34 as best shown in FIGS. 2 and 3. Bars 44 can be attached to wall 42 and points 46 by any suitable means, for example bolts or welding. Because mechanism 28 is fixably secured to platform 12, platform 12 can be used to adjust the height of mechanism 28. More specifically, in a conventional combine, the platform is adjustable to a variety of vertical heights through use of hydraulic or other means. Thus, by adjusting the height of platform 12, the cutting height of mechanism 28 can also be adjusted.

After the comminuted crop plant is discharged into platform 12 through port 36, platform 12 operates in a conventional manner to feed the comminuted material into separator 14 of the combine. More specifically, laterally oriented platform auger 48 has a flight 50 which serves to convey the comminuted material to one side of the platform via a rotating screw like motion as best shown in FIG. 4. Once adjacent the one side of platform 12, retracting fingers 52 are used to force the comminuted material into feeder conveyor 54 located in a port 56 formed on rear wall 42. The flow of the comminuted material is depicted by the arrows in FIGS. 3 and 4. Conveyor 54 serves to convey the comminuted plant into separator 14 wherein the grain of the plant is separated from the rest of the comminuted material through a series of feeding, thrashing and sifting operations. The grain is then conveyed to bin 16 for collection.

Mechanism 28 is powered by a drive shaft 58 extending from a transfer case 60 positioned in the line of the power takeoff shaft 20 extending from tractor outlet 22 to combine inlet 24 as best shown in FIGS. 1, 2, and 4. Thus, shaft 20 is easily modified to power mechanism 28 by the addition of transfer case 60 and shaft 58.

Because the crop plant is comminuted when introduced into platform 12, and the small pieces of the plant could possibly be discharged from platform 12 by wind, or the operation of auger 48 or fingers 52, a screen 62 is positioned over the entire top of platform 12 as best shown in FIGS. 2–4. Screen 62 has reinforcing members 64 positioned to hold and provide a frame for the screened material. The rearward edge 66 of screen 62 is pivotally attached to the top edge of wall 42 so that screen 62 can be pivoted upwardly by use of handles 68 to provide access to the interior of platform 12 as shown in FIG. 3 in phantom lines. Screen 62 prevents the comminuted crop plant introduced into platform 12 via port 36 from being blown or discharged out the top of platform 12. Screen 62 also allows the operator to see within platform 12 to gauge the flow of material into platform 12 and thus separator 14. The pivotal nature of screen 12 allows easy access for cleaning, maintenance and/or repair of the interior mechanisms of the platform.

It has also been found that because the crop plant material is introduced into platform 12 at port 36 only, it is not necessary to have the full length of a conventional platform. Therefore, the length of platform 12 can be modified generally by moving one of the sidewalls 40 inwardly. For instance, when using the invention with a John Deere 6601 combine, it has been found desirable to decrease the length of the platform from twelve feet to nine feet.

As discussed, separator 14 is of a conventional nature and it is not necessary to modify it in any way to perform its functions on the comminuted crop plant. In fact, it has been found that feeding the already comminuted crop plant into separator 14 greatly increases the efficiency of the separator because the materials are already broken down into small pieces. For instance, with respect to a corn plant, after the corn plant has passed through chopper 34, the stalks, leaves, ears and husks are all comminuted. Therefore, the cylinder bars (not shown) of the separator and the rest of the thrashing and sifting mechanisms of the separator (not shown) have an easier time operating to separate corn kernels from the rest of the broken down plant.

As discussed, the grain separated is collected in bin 16, the remaining plant residue ingested in separator 14 is conveyed to the rearward portion 70 of separator 14. In a conventional combine, any crop residue remaining is discharged to the ground through an opening 72 formed in rearward portion 70 as best shown in FIGS. 5 and 6. Oftentimes, the crop residue is spread through mechanical means positioned within opening 72, for instance, by a straw spreader attachment. These attachments strictly spread the straw and residue over a larger area of the ground so that the residue can be more easily incorporated into the ground at a later date.

The present invention involves modification of the rearward portion 70 to collect all the comminuted residue being discharged through opening 72. More specifically, a U-shaped trough 74 is formed adjacent a forward edge 75 of opening 72 as best shown in FIGS. 6 and 7. Positioned within trough 74 is a conveying auger 76. Auger 76 serves to convey comminuted crop residue to the left in FIG. 7 so that the residue can be introduced and blown upwardly by fan 78. Fan 78 is positioned on the left side of portion 70 and mounted to a platform 80 secured to the frame of separator 14 as best shown in FIGS. 5 and 7. Fan 78 has an outlet 82 connected to an adjustable blow chute 84 as shown in FIG. 5. Blow chute 84 serves to direct the residue collected in trough 74 and blown by fan 78 into collecting wagon 86 towed behind separator 14 by use of hitch arrangement 88 as best shown in FIGS. 1 and 5. Chute 84 is rotatable in a horizontal plane so it can be adjusted to blow the comminuted crop residue into wagon 86.

Figure 8:
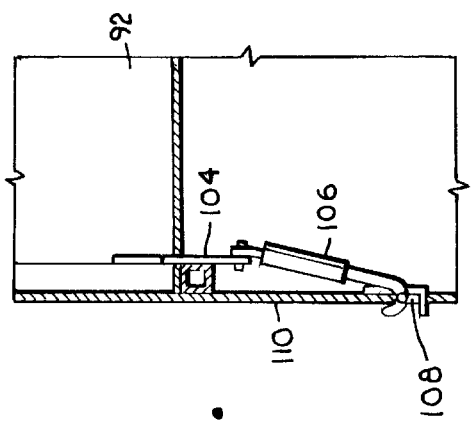
FIG. 8 is an enlarged detailed cross-sectional view taken generally along lines 8—8 of FIG. 6 and showing the structure for securing the blocking plate in its blocking position.

To ensure that all of the crop residue exiting opening 72 is collected within trough 74, a planar slanted collection/blocking plate 92 is positioned diagonally within opening 72 as shown in FIG. 6. More specifically, plate 92 has a pair of hooks 94 positioned adjacent its outer edges which engage a connecting rod 96 extending completely across rearward portion 70 generally within opening 72. The lower edge 98 of plate 92 rests on the rearward edge 100 of trough 74 and is held thereon by means of channel 102 which is attached to edge 98 and releasably engages edge 100. Therefore, plate 92 is held in place by the engagement of channel 102 with edge 100 and the engagement of hooks 94 with rod 96. Plate 92 is held securely in place by means of a pair of connecting members 104 extending downwardly from opposite edges of plate 92. Positioned at the lower end of each member 104 is a spring loaded T-shaped fastener 106. Each fastener 106 engages a corresponding slot 108 formed in sidewalls 110 of rearward portion 70. More specifically, in order to secure plate 92 in place, the spring in fasteners 106 are compressed such that the T-head of fasteners 106 grip the outside surfaces of the wall forming slot 108 as shown in FIG. 8. The compression of the spring in fasteners 106 ensures that fasteners 106 are maintained in slots 108.

Plate 92 is completely removable from opening 72 by first releasing fasteners 106 from slots 108. Thereafter, handle 112 is used to lift upwardly on plate 92 until channel 102 disengages edge 100 and further upwardly until hooks 94 disengage rod 96. Therefore, plate 92 can be completely removed from opening 72. Additionally, after channel 102 has been disengaged from edge 100, hooks 94 can still be maintained about rod 96 such that plate 92 can be swung outwardly about rod 96 without the plate being completely disengaged from portion 70. This swinging option is shown in phantom lines in FIG. 6. The versatile removal of plate 92 allows easy access for cleaning and repair of the mechanical structures found in the rearward portion 70 of separator 14.

As best shown in FIG. 7, auger 76 and fan 78 are powered by input pulley 114. Pulley 114 is connected via belt 116 to a straw spreader drive pulley (not shown) which in a conventional combine is used to drive the conventional straw spreader attachments which are typically positioned in opening 72. Therefore, to accommodate and drive auger 76 and fan 78, an existing drive system of the combine is simply modified. More specifically, a fan drive shaft 120 is fixedly secured to pulley 114 and rotatably supported by frame members 123 as shown in FIGS. 6 and 7. The other end of shaft 120 is fixedly secured to the vanes 121 of fan 78. Thus, by rotation of shaft 120 via pulley 114, fan vanes 121 are powered and can supply the blowing action to propel the comminuted crop residue into wagon 86. Additionally, located inside of pulley 114 is a drive sprocket 122. Sprocket 122 is connected via chain 124 to another sprocket 126 positioned at one end of auger 76. Therefore, rotation of pulley 114 also results in powering and rotation of auger 76. Auger 76 is also rotatably supported by frame members 123. The other end of auger 76 ends at a material inlet 127 to fan 78. Pulley 114 and sprockets 122 and 126 are dimensioned so as to provide appropriate speeds to fan 78 and auger 76.

Trough 74, auger 76, fan 78 and chute 84 can all come from a conventional silage cutter. For instance, these structures are typically connected to conventional silage cutting and chopping mechanisms in some manner to form an entire silage cutter and collection device. As is apparent, the unique and novel aspects of these structures is the adaptation and modification for positioning them on the rearward portion 70 of separator 14.

In operation, machine 10 and wagon 86 are pulled through the field and powered by tractor 18 as shown in FIG.

1. One or more rows of crop plants are aligned with guides 30 and 32 so that the entire plant is cut and feed through chopper 34. In chopper 34 the entire plant including any leaves, stalks, husks and ears is comminuted into a suitable size for silage. Thereafter, the comminuted plant is introduced into platform 12 where auger 48 and fingers 52 convey the material to feeder 54. Conveyor 54 conveys the comminuted plant into separator 14 wherein the grain of the plant is separated from the rest of the material. The grain is conveyed to bin 16 and the rest of the material is collected within rearward portion 70 by plate 92 and trough 74. The comminuted residue is conveyed by auger 76 into fan 78 which blows the comminuted material through chute 84 into wagon 86. Thus, the grain separated from the plant is collected in bin 16 while the rest of the comminuted residue of the plant is collected in wagon 86. The grain collected in bin 16 can be unloaded onto a truck (not shown) via an unloading auger 132. Further, the residue collected in wagon 86 can be unloaded onto a truck (not shown) by, for instance, use of hydraulic cylinders which tip a container of wagon 86 so that the contents thereof are emptied onto a truck.

Thus, as is apparent, in one pass of the field the entire crop plant is collected. The grain is conveyed to one storage bin and the residue is conveyed to a collecting wagon to be used as silage. This is a substantial advantage over prior art structures which require two passes over the field. These prior art structures required one pass to collect the grain and another pass to chop and collect the remaining stalks. An additional advantage is the fact that because the stalks and leaves are collected at the same time as the grain, moisture is retained within the stalks and leaves which will aid in the fermentation to produce the silage. It has been found desirous for the moisture content of the grain to be approximately 25% and the moisture content of the silage to be approximately 50% during harvest. This allows adequate comminuting of the corn plant and adequate moisture for silage while at the same time allowing collection of the grain with an acceptable level of drying. Because the crop plant is comminuted at the very beginning in mechanism 28, and thereafter passed through separator 14 in a comminuted state, the efficiency of the separation process in separator 14 is greatly increased. Therefore, the rate of collection and speed with which the machine moves over the ground is enhanced over prior art structures. Further, it is not necessary to modify the internal workings of separator 14 from that of a conventional combine. Thus, the present invention offers a very efficient cost effective manner of collection of both silage and grain.

It has been found that running the grain through chopper 34 may result in some damage to the grain, however, not enough that would amount to a dock or discount, if and when the grain is sold for commercial purposes. Further, it has been found that approximately 15% of the grain will pass through into the wagon 86 thus enhancing the nutritional value of the livestock feed collected therein.

The present invention offers substantial savings to a farmer or rancher. More specifically, it has been found that two to four cows can be sustained through one winter off of the silage collected from one acre of corn. In other words, approximately 12 tons of silage is collected per acre. This can result in a savings to a farmer or rancher of approximately $350 per acre cut utilizing the present invention. An additional advantage of the present invention is the removal of substantially all the residue from the field. More specifically, if no till farming is used, as is often the case in the growing of corn because of the costs of working corn stalks into the soil, the ground typically is three to six degrees cooler than the atmospheric air. This coolness reduces the ability of seeds to emerge through the ground thus decreasing the yield of the harvest. Therefore, by utilizing substantially the entire stalks and leaving very little residue, the ground can be replanted without substantial preparation and without the decrease in yield associated with no till farming.

Having described the invention, what is claimed is:

1. A harvesting machine for a crop, the crop having a grain and plant residue, the plant residue capable of being comminuted and used as livestock feed, the machine comprising:

a separator for separating grain from the plant residue, said separator having a platform adjustable to different heights positioned on a front end of said separator, said separator also having a rearward end for discharging plant residue separated from grain;

a cutter attached to the front end of said platform and capable of cutting the crop close to ground level and feeding both the grain and plant residue into said platform;

a chopper interposed between said cutter and said platform so that the plant residue of said crop are comminuted prior to entering said platform and prior to the grain being separated from the plant residue.

2. The harvesting machine of claim 1 further comprising:

a blower attached to said rearward end of said separator, said blower blowing said comminuted plant residue into a collection receptacle after the grain has been separated therefrom.

3. The harvesting machine of claim 2 wherein said blower is offset to one said of said separator and wherein the harvesting machine further comprises a laterally extending auger for conveying the comminuted plant residue to said blower.

4. The harvesting machine of claim 2 wherein said blower blows the comminuted plant residue into a wagon pulled behind the separator.

5. The harvesting machine of claim 1 wherein said separator is pulled behind and powered by a tractor.

6. The harvesting machine of claim 1 wherein said platform has a screen positioned across an upper open end platform, said screen preventing grain and comminuted plant residue from being expelled from the platform during operation.

7. A method of modifying a grain combine used to harvest a crop having grain and plant residue to allow silage to be collected from a rearward end of the combine, the combine having an adjustable platform having a front end and an upper end, the combine further having a separator, the method comprising:

attaching a cutter to the front end of the platform;

interposing a chopper between the cutter and the platform so that plant residue of a crop being harvested is comminuted prior to entering the platform and prior to grain being separated from the plant residue.

8. The method of claim 7 further comprising:

attaching a blower to a rearward open end of the separator, said blower blowing the comminuted plant residue into a receptacle.

9. The method of claim 7 further comprising:

attaching a screen to the upper end of the platform to prevent grain and comminuted plant residue from being expelled from the platform.

* * * * *